Sept. 8, 1970 W. E. HOWALD 3,527,543
COOLING OF STRUCTURAL MEMBERS PARTICULARLY
FOR GAS TURBINE ENGINES
Filed Aug. 26, 1965 3 Sheets-Sheet 1

INVENTOR.
WERNER E. HOWALD
BY

ATTORNEY—

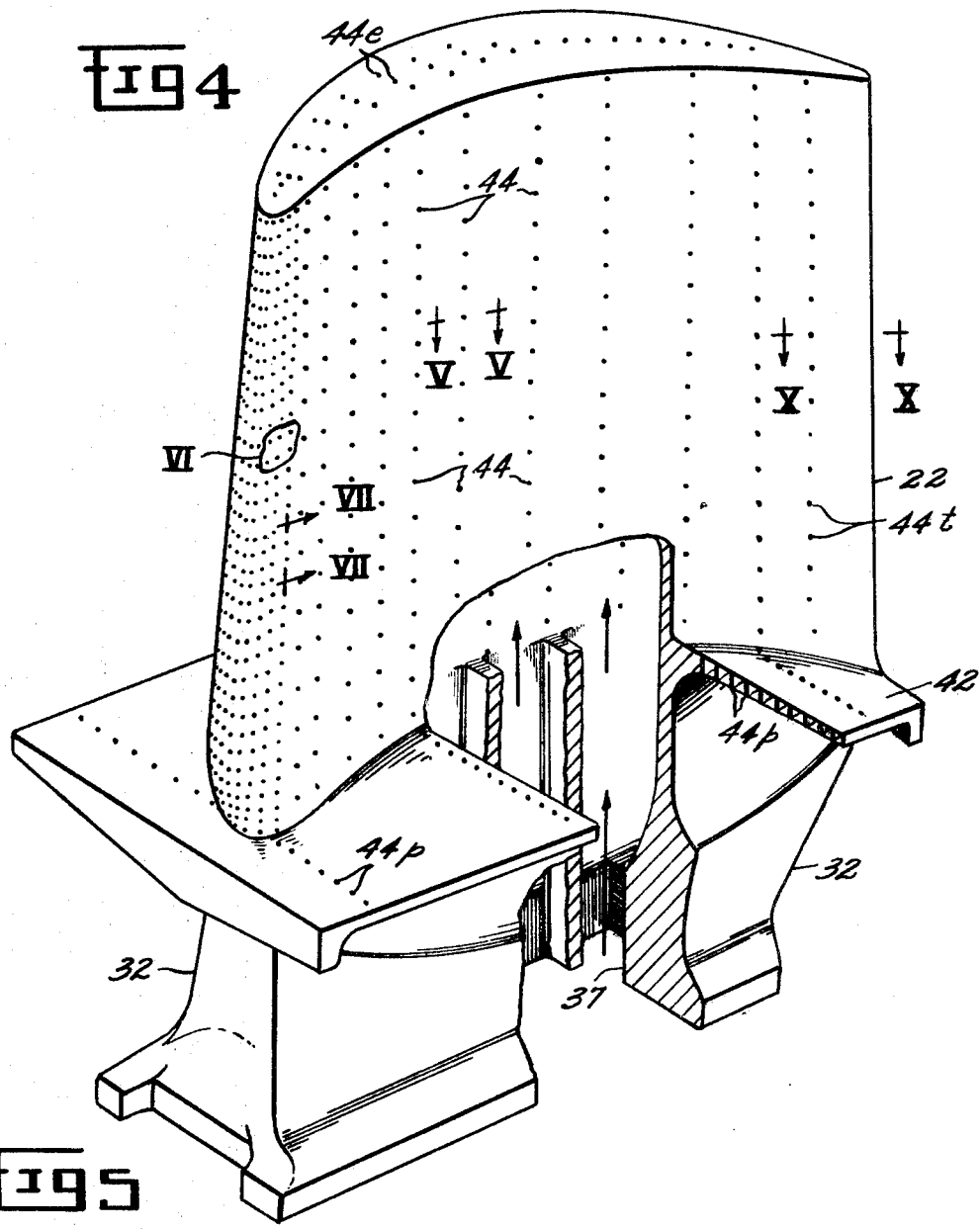
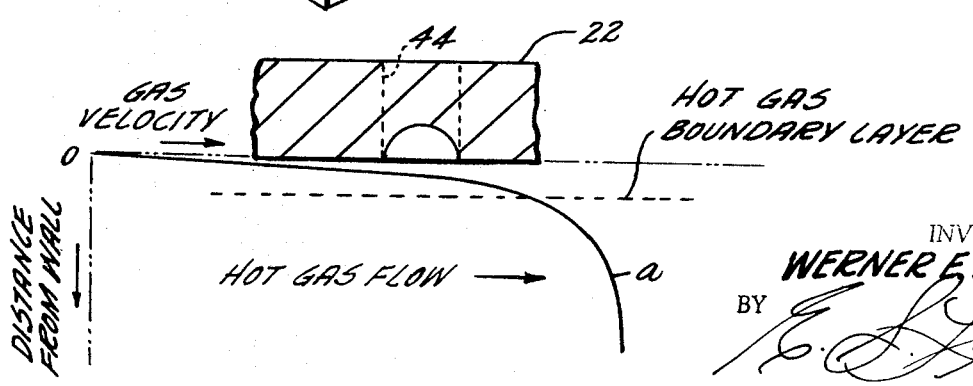

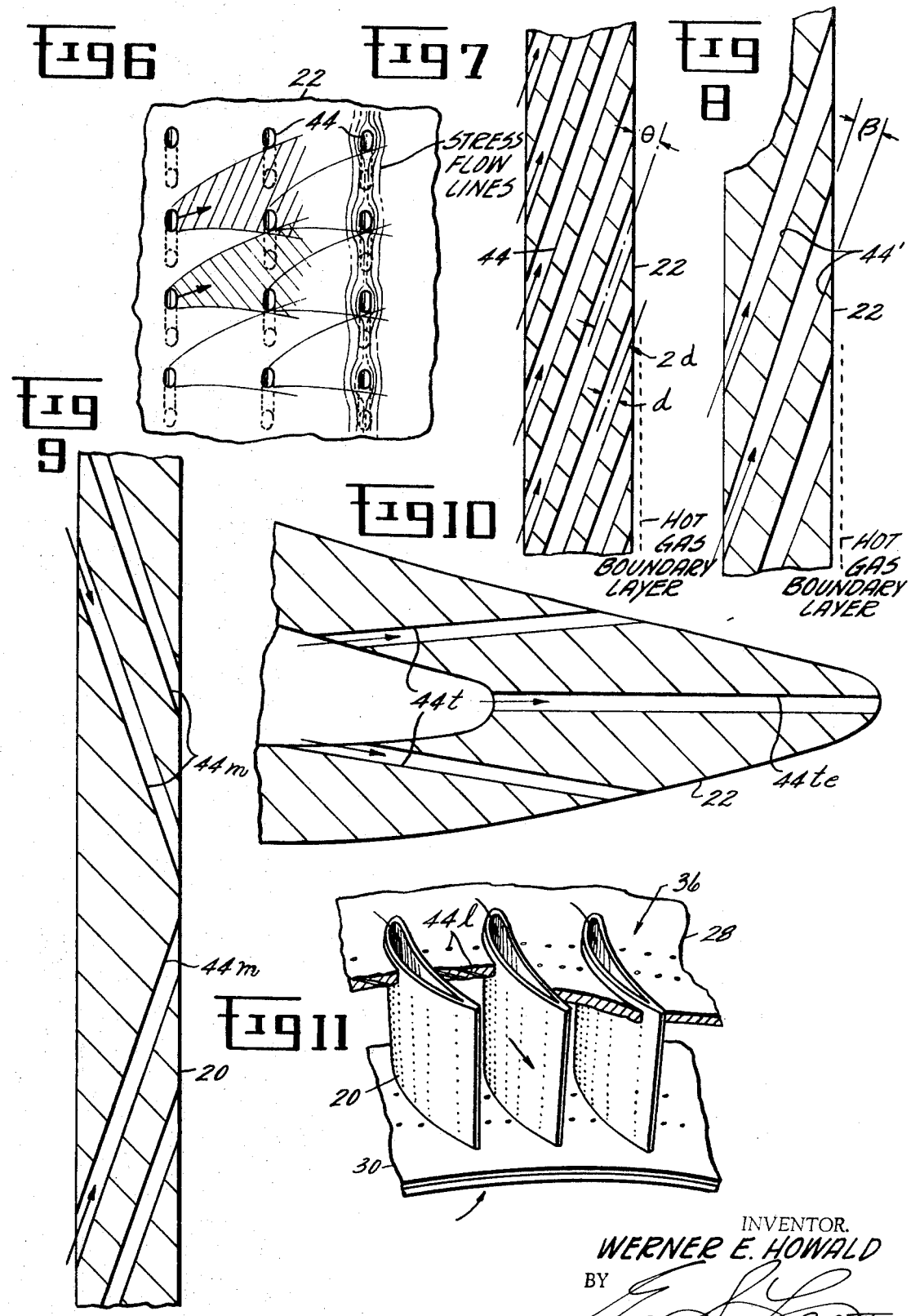

United States Patent Office 3,527,543
Patented Sept. 8, 1970

3,527,543
COOLING OF STRUCTURAL MEMBERS PARTICULARLY FOR GAS TURBINE ENGINES
Werner E. Howald, Cincinnati, Ohio, assignor to General Electric Company, a corporation of New York
Continuation-in-part of application Ser. No. 325,508, Nov. 21, 1963. This application Aug. 26, 1965, Ser. No. 483,389
Int. Cl. F01d 5/08
U.S. Cl. 416—90  14 Claims The present invention relates to improvements in gas turbine engines and more particularly to improved means for cooling structural members thereof. This application is a continuation-in-part of my co-pending application Ser. No. 325,508, filed Nov. 21, 1963 and now abandoned.

Gas turbine engines conventionally comprise an axial flow compressor which compresses air to the proper density required for supporting combustion of fuel in a combustion chamber. The combustion gases then pass to a turbine which powers the axial flow compressor. After passing through the turbine, the high energy combustion gases may be employed to drive a power turbine which is connected to an output shaft on which may be mounted a propeller or other device. Alternatively the high energy combustion gases may be utilized directly as a thrust to provide motive power, as in "turbojet" engines commonly used for aircraft.

Having specific reference to the structural elements of a turbine, a circumferential row of guide vanes or nozzles directs the combustion gases to a row of turbine blades or buckets mounted on a rotor, forming in combination therewith a "stage." A plurality of stages may be employed, but in any event it is the first stage which is subjected to the highest temperatures. These stator nozzles and rotor buckets (sometimes generically referred to as blades herein) are of airfoil shape and are highly stressed, particularly the rotor buckets.

Compressor turbines for such engines have posed serious problems in obtaining high performance operation particularly where thrusts for flight at speeds above Mach 2.5 are required. Turbine weight is one factor. However, a more important limitation is that the capabilities of the turbine by and large establish the maximum operating temperature of the engine and prevent operation at extreme temperatures—4000° F. is desired—where the necessary high efficiency is known to be possible.

While materials are available which will not actually melt at temperatures in the order of 4000° F., present and foreseeable developments in metallurgical technology have not made available or promise materials which have the necessary structural strength for turbine operation at such temperatures.

Recognition of this temperature-materials problem is not new and various proposals have been made for cooling the turbine components and particularly the blades thereof. These proposals may be broken into four general categories, (a) air convection cooling, where cooling air is passed through passageways extending lengthwise of the blades; (b) liquid convection cooling, wherein liquid metal, such as sodium, is passed through radial passageways in the blade and recirculated through a condenser; (c) airfilm cooling (U.S. Pat. 2,489,683) where a film of cooling air is passed through slots in the blade; and (d) transpiration cooling (U.S. Pat. 3,067,982) where cooling air percolates through a foraminous shell.

Briefly outlining the limitations of these various proposals, the air convection cooling approach is capable of providing only a relatively small amount of cooling effect and tends to require a relatively high amount of cooling air which in turn reduces over-all engine efficiency. The liquid convection cooling approach has greater efficiency but is both complicated and expensive due to the handling of hot metal. The use of airfilm cooling gives greater cooling effect but requires such a great amount of cooling air that over-all engine efficiency is seriously handicapped. In transpiration cooling the foraminous shell requires support by an inner structural core. While this approach provides good cooling effectiveness, it is both unduly expensive and lacking in the necessary structural strength for the high stresses which the turbine components are subjected to. Further, the minute passageways of the shell are inefficient in their use of cooling air, as well as being subjected to the hazard of clogging.

Beyond the limitations discussed above, none of the prior attempts at blade cooling are truly compatible with the need to reduce turbine weight by forming the blades as thin walled airfoil shells with little or no internal reinforcement.

One object of the present invention is to provide improved means for cooling the structural components of a gas turbine and particularly to make practical the operation of such turbines at extreme elevated temperatures.

Another and more specific object of the invention is to provide cooling means for the rotor and stator blades of such gas turbine engines and to do so in a manner employing a minimum of coolant and a maximum over-all efficiency both in engine operation and cooling effectiveness, as well as to facilitate the use of light weight, thin-walled shells as the blade structure.

In its broader aspects a further object of the invention is to provide improved means for cooling structural members which are employed to define at least in part a flow path for gases at extreme elevated temperatures, and particularly gases which are traveling at high velocities as well.

Briefly and in its broader aspects the invention is characterized by a structural member, the "outer" surface of which defines a flow path for a hot gas stream moving therepast at a relatively high velocity. The opposite surface of this member defines, at least in part, a chamber. Means are provided for pressurizing a coolant, preferably air, within this chamber to a pressure somewhat greater than the static pressure of the gas stream flowing therepast. Discrete holes are provided through the member so that the coolant may flow from the pressurized chamber to the "outer" surface thereof. These holes are selectively disposed so that coolant flowing therefrom forms a substantially overall coverage of said surface by being entrapped in the boundary layer between the flowing gas stream and the surface itself.

Preferably the coolant holes are oriented so that the coolant gas inertia vector outwardly of the "outer" surface is a minimum and there is substantially no inertia vector component in a direction counter to the gas flow in the boundary layer. More specifically the coolant holes are angled toward the "outer" surface and the mass flow (gas velocity X gas density) ratio of the coolant to the hot gas stream maintained so that the coolant air is spread over a much wider area than the opening of the hole itself. Further benefits are attained by maintaining the ratio of hole length to hole diameter greater than about 10/1. Also it is advantageous that the holes be divergently tapered to increase the volume of coolant that can be effectively distributed in the boundary layer from a given hole.

Another aspect of the invention is in the orientation of the holes so that adequate cooling action can be obtained and yet enable the desired lightweight shell type blade to have adequate strength to withstand the high stresses to which it is subjected. Thus, the coolant holes are preferably circular in cross section so that when angled relative to the "outer" surface they form elliptical openings. These openings may be oriented in the direction of stress flow to minimize the detrimental effect of stress concentrations particularly in areas of high stress. Further it is preferred that such holes be aligned in rows to further enhance the overall strength of a structural member and particularly turbine blades.

With more specific reference to such blades the holes are concentrated to a greater extent at the leading edge portion of their airfoil cross section for maximum efficiency of coolant air consumption and also to minimize stress causing thermal gradients. Further the cooling holes at the trailing edge portion are preferably angled in the direction of hot gas flow to overcome problems unique to this area.

Turbine buckets are also preferably provided with cooling holes in their ends and platforms as well, to provide an overall solution to turbine operation at extreme elevated temperatures. This overall solution is further characterized by the provision of cooling, employing the same principles, for the shrouds and liners which also define the hot gas flow path in the turbine.

The above and other related objects and features of the invention will be apparent from a reading of the following description of the disclosure found in the accompanying drawings and the novelty thereof pointed out in the appended claims. In the drawings:

FIG. 1 is an elevation briefly depicting a gas turbine engine of the type herein referred to;

FIG. 4 is a perspective view on an enlarged scale of the turbine bucket seen in FIG. 2 with portions thereof broken away and in section;

FIG. 5 is a section, on a greatly enlarged scale, taken on line V—V in FIG. 4 with a plot of gas velocity thereon;

FIG. 6 is a view, on a further enlarged scale, of the area, of the turbine bucket surface within outline VI in FIG. 4;

FIG. 7 is a section taken on line VII—VII in FIG. 4;

FIG. 8 is a section similar to that of FIG. 7 illustrating an alternate form of cooling holes;

FIG. 9 is a section, on an enlarged scale, taken on line IX—IX in FIG. 2;

FIG. 10 is a section, on an enlarged scale, taken on line X—X in FIG. 4; and

FIG. 11 is a section, on an enlarged scale, in perspective, taken generally on line XI—XI in FIG. 2.

Figure 1:
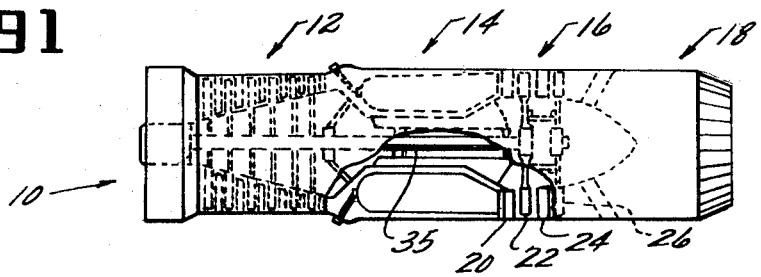

Having a reference first to FIG. 1, a gas turbine engine 10 is briefly illustrated. This engine comprises an axial flow compressor 12 which compresses air to the proper density for supporting combustion of fuel within an annular combustor 14. The combustion gases pass through a turbine 16 which is connected to the rotor of the compressor 12 and provides means for driving the latter. The combustion gases then pass to a discharge nozzle section 18 and thereby provide a thrust which is employed as the motive force for aircraft or the like.

Figure 2:
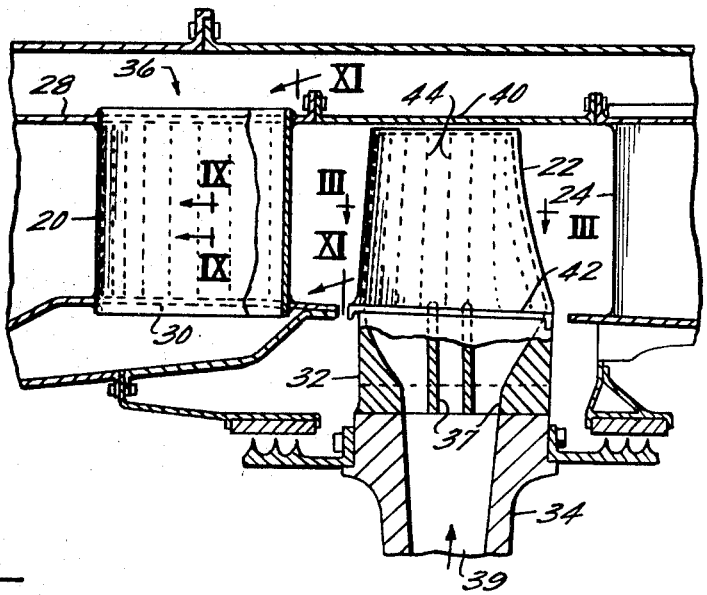
FIG. 2 is a fragmentary, enlarged longitudinal section illustrating the compressor turbine employed in the engine of FIG.1.
Figure 3:
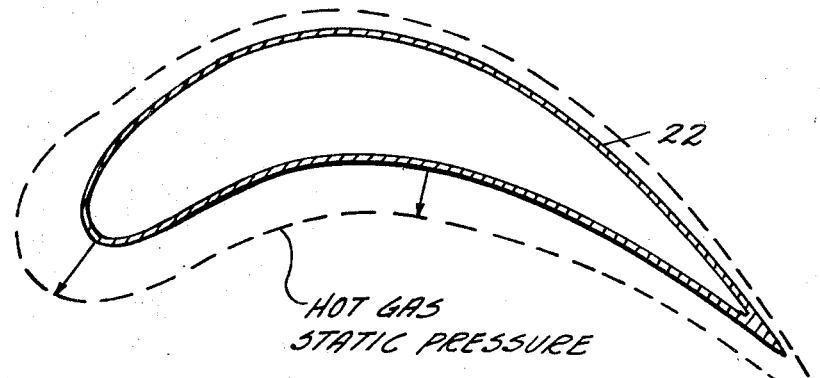
FIG. 3 is a view, on an enlarged scale, taken on line III—III in FIG. 2 with an exemplary plot of pressure distribution.
Figure 3:

The combustion gases from the combustor 14 are at extremely high temperatures as they enter the compressor turbine 16, the object of the present invention being to enable these gas temperatures to be substantially higher than has previously been possible. The turbine 16 (FIG. 1 and 2) is exemplarily illustrated as being a two stage turbine comprising circumferential rows of first nozzles 20 and first buckets 22 forming one stage and circumferential rows of second nozzles 24 and second buckets 26 forming the second stage. The first stage of the turbine is most critically affected by the hot gases and therefore the present description will be limited thereto. Each nozzle 20 and each bucket 22 are preferably formed as thin-walled shells usually having a thickness in the order of .030 to .080 inch, as indicated in FIGS. 2, 3, and 4. A high heat strength material is employed in forming these blades, for example, a carbon steel alloyed with tungsten and chromium or other materials known to the metallurgical art.

The nozzles 20 may be supported at their opposite ends by annular liners 28 and 30 respectively. Each turbine bucket 22 is provided with a tang 32 which provides means for its being mounted on a rotor 34 which in turn is attached to a shaft 35 to which the rotor of the compressor 12 is also secured. Cooling air is supplied to the nozzles 20 from plenum chambers 36, 38 at their opposite ends which are defined in part by the liners 28, 30 respectively. These plenum chambers are connected by internal passageways to a source of cooling air, preferably derived from one of the stages of the compressor 12 so that a predetermined coolant pressure may be maintained within the nozzles 20.

Likewise coolant air is provided to the interior of turbine buckets 22. Thus passageways 37 through each tang 32 communicate with a hollow plenum chamber 39 in the rotor 34. The chamber 39 is also connected to a source of pressurized cooling air preferably derived from one of the stages of the compressor 12 so that a predetermined pressure level may be maintained at all times within the buckets 22.

The combustion gases from the combustor 14 pass by the nozzles 20 and are thereby properly directed towards the buckets 22 to drive the turbine rotor with maximum efficiency. In driving the rotor, the buckets 22 are subjected to substantial stresses, not only due to the impingement force of the hot gases, but also to a large extent due to centrifugal force resulting from the extremely high rates of rotation which are preferred in turbine and compressor operation for greater efficiency. The flow path for the hot gases passing through the first stage turbine is defined by the thin-walled nozzles 20, buckets 22, the liners 28 and 30, by a shroud 40 surrounding the buckets 22 and by platforms 42 formed at the base of each bucket (see also FIG. 4). Appropriate seals are also provided, to maintain the hot gases in this flow path as indicated in FIG. 2.

The thin-walled construction of the nozzles 20 and rotor buckets, or blades, enables a substantial reduction in over-all turbine weight as compared with the usual type of construction employed. Cooling of this bucket at extreme elevated temperatures poses a difficult problem particularly because of the high stresses which are necessarily encountered. The cooling mechanism now to be described not only prevents deterioration of the blades but also preserves the necessary strength requirements.

The interiors of the nozzles 20 and buckets 22 are pressurized with cooling air so that they function as plenum chambers for the effective distribution of coolant through selectively disposed, discrete passageways over the outer flow path defining surfaces thereof. In describing these cooling passages reference will be made to FIGS. 4–7 in particular, illustrating one of the buckets 22.

The passageways preferably take the form of a plurality of holes 44 which extend from the interior of the bucket 22 to its outer airfoil shaped surface. The disposition and orientation of the holes 44 are such that coolant air emanates therefrom and is effectively diffused over the entire outer surface of the bucket. A highly effective and efficient cooling action is obtained by the means of diffusing or entraining the coolant air into the boundary layer which exists between the hot combustion gases, traveling at a high velocity, and the airfoil surface itself.

This boundary layer is illustrated in FIG. 5 where curve *a* is a representative plot of combustion of hot gas velocity as it exists in passing along the outer surface of the bucket 22. It will be seen that a short distance from the outer surface of the bucket 22 there is a sharp drop-off in gas velocity. This point of velocity decrease is the usual reference for defining the boundary layer of low velocity gas existing on the bucket surface, or other flow defining surface. The thickness of this boundary layer is extremely thin and may be in the order of .010 inch. In any event, the means employed by the present invention entrains the cooling air in this boundary layer so that it moves at a relatively slow speed and has maximum effectiveness in cooling the bucket material without being ineffectively dissipated in the hot gas stream.

Many interrelated factors contribute to the effectiveness of the holes 44 in providing the desired cooling action. For the usual parameters of turbine design the discrete holes employed are preferably circular in cross section and have a diameter no smaller than about .005 inch with a maximum diameter of about .025 inch. Preferably the holes are inclined to the outer surface of the bucket on an angle (see angle θ in FIG. 7) of 45° or less and preferably between the approximate limits of 10° and 30°. It is further perfered that the axes of the holes 44 be disposed in planes normal to the outer flow surface and normal to the path of hot gas flow as will be apparent from FIGS. 6 and 7.

Apart from the dimensional relationship of the holes, the amount of coolant air passing therethrough is also a function of the pressure differential between the interior of the bucket 22 and the static hot gas pressure on its outer surface. Reference is made to FIG. 3 which shows a representative distribution of static hot gas pressure on the outer surface of turbine bucket airfoil. The highest pressure is at the leading edge of the bucket and the cancave pressure side is also subject to much higher pressures than the convex suction side. It has been found that the interior bucket pressure should preferably be established at 5 to 8% above the maximum static pressure of the hot gases. It will further be noted that the interior of the bucket 22 functions as a plenum with substantial equal pressure at all points. This is to say that the combined areas of all of the holes 44 is less than the area of cooling air entrance passageway thereto.

FIG. 6 illustrates a representative distribution of coolant air from the holes 44 over the outer surface of the bucket 22. Because of the angular disposition of these holes elliptical openings are created in the outer bucket surface. The coolant air entrained in the boundary layer is distributed and is effective over a much wider area than the actual elliptical opening of the hole as well as extending for a substantial distance in a direction chordally of the bucket.

Effective spreading of the coolant stream has also been found to be a function of the mass flow (gas velocity X gas density) ratio between the coolant air and the combustion gases. Preferably this ratio should be 3 or less. As was noted above there is a wide variation in hot gas static pressure on different areas of the bucket (FIG. 3). As was previously noted, the coolant pressure on the interior of the bucket, since it is a plenum chamber, is substantially constant at all points. Thus where there is a maximum pressure differential across the holes 44, as on the suction side of the bucket, coolant velocity will be greatly increased. Advantageously at such areas of decreased static pressure the velocity of the hot gases increases so that the mass flow ratio of 3 to 1 or less will be maintained at all points without compartmentizing the interior of the bucket and usually, if not alawys, using the same size and orientation of holes.

The effective distribution of cooling air into the hot gas boundary layer may be further enhanced by the use of diffuser cooling holes 44' illustrated in FIG. 9. These holes are divergently tapered on an included angle β of 4° to 12° thereby minimizing the coolant velocity as it reaches the outer bucket surface whereby it is entrained to an even greater extent in the hot gas boundary layer.

It is also recognized that the coolant requirements vary at different points around the bucket profile with the greatest heat concentration being at its leading edge portion. The holes 44 are therefore selectively concentrated in this area as will be evident from FIG. 4. In the concentration of holes it has been found that maximum effectiveness, both for cooling and strength purposes, is obtained using a minimum spacing, measured in a direction normal to the hole axes, of two diameters (2d in FIG. 7). Downstream of the leading edge the cooling holes may be spaced further apart in both a lengthwise and chordal direction of the bucket since the coolant air entrained in the hot gas boundary layer tends to have a cumulative effect as well as there being a reduction in the cooling requirements.

In connection with cooling of the leading edge of the bucket it will also be pointed out that the concentration of angled holes in this area provides a convection cooling effect as well which combined with the cooling action at the outer surface has contributed to overcoming an apparently insurmountable problem. Thus, with the minimum spacing of two diameters between adjacent holes heat is absorbed from the bucket material with maximum effectiveness as it passes through passageways of much greater length than the thickness of the bucket itself. It has also been found that the convection cooling effect, above referred to, as well as effective entrainment of the cooling air in the boundary layer is best effected by dimensioning the holes 44 is "pipes." That is, within the other parameters herein thought it is preferable that the ratio of hole length to hole diameter be 10/1 or greater.

It has previously been pointed out that one of the objects of the invention was to enable the use of lightweight airfoil shells in the fabrication of turbine nozzles and buckets. In doing so the bucket material must be capable of withstanding extreme stresses. The described orientation of the holes 44 or 44' is particularly significant in minimizing the loss of strength which naturally results from the removal of material from the bucket shell. Thus it will again be noted that the circular holes create elliptical openings in the inner and outer surfaces of the bucket. The long axes of these ellipses are disposed lengthwise of the bucket and are aligned with the stress flow (FIG. 6) therein since the primary stress on the bucket is also in a lengthwise direction. This orientation of the elliptical openings provides a minimum stress concentration factor.

In connection with the high strength obtainable in cooling turbine blades in accordance with the present invention, it will also be noted that the holes 44 are preferably arranged in rows running lengthwise of the blade and spaced apart chordally thereof. This arrangement further minimizes stress concentrations and provides greater overall strength. It will be seen that the lengthwise alignment of holes in adjacent rows is preferably selected so that the coolant from the upstream holes will pass between the holes of the next row (see FIG. 6) for best overall coverage of the coolant.

It was previously pointed out that the preferred orientation of the axes of the holes 44, 44' is in a plane normal to the direction of gas flow which in turn minimizes stress concentrations. Where stress concentrations are not of primary significance the holes may be angled in a direction partially toward that of the gas flow, say 30° from the illustrated lengthwise direction, to further enhance cooling effectiveness.

As has been indicated, the present invention is concerned with the practical operation of gas turbines at extreme temperatures. This entails not only cooling the airfoil portion of a bucket but other critical portions as well. Referring to FIGS. 4 and 10, it will be seen that the trailing edge portion of the airfoil is relatively thick due to the relatively low angle of convergence of the pressure and suction surfaces thereof. This area is best cooled by inclining the cooling holes $44_t$ in a direction downstream of the gas flow. The relationships for enhanced cooling efficiency, discussed in connection with the other holes 44, are otherwise applicable to the holes $44_t$. While the disposition of the elliptical openings of the holes does not minimize stress concentrations as would be desired, but on the other hand the amount of material necessarily provided in this area is adequate. To further cool the trailing portion of the airfoil, holes $44_{te}$ extend through the middle of the end portion.

It will further be noted that holes $44_e$ (FIG. 4) are provided in the free end of the bucket 22. These holes may be normal to the end surface of the bucket for ease of manufacture since the strength and cooling requirements for this area are not too great. In addition means are provided for cooling the platform 42 of the bucket again employing holes $44_p$ which would be in the order of .005 to .025 diameter and extend therethrough as indicated in FIG. 4. The under surface of the platform is pressurized with coolant air which again is distributed in the hot gas boundary layer passing thereover.

The nozzles 20 are provided with cooling holes oriented in accordance with the principles discussed in connection with the bucket 22. One further point to be noted is that the orientation of the holes 44 in the bucket 22 is such that the flow path of cooling area entering through the tang 32 minimizes energy losses due to turning as well as facilitating the discharge of dirt therefrom. In the case of the relatively fixed nozzles 20 the situation is different in that coolant air may enter from both ends thereof. It is therefore advantageous to employ the hole orientation seen in FIG. 9 wherein the upper half of a row of coolant holes $44_m$ is angled downwardly and the lower half is angled upwardly.

Again in connection with the overall problems of turbine operation, cooling means are also provided for the liners 28 and 30 and shroud 40. These means are described in connection with the liner 28 and similarly applied to the other components.

Having reference to FIGS. 2 and 11 it will be seen that a plurality of holes $44_1$ are provided to transmit coolant air from the chamber 36 to the "outer" flow defining surface of the liner. The same relationships given above are applied to entrain the coolant air in the hot gas boundary layer and obtain efficient cooling action and maximum strength.

Not only does the described invention provide a controlled flow of coolant air under all operating conditions, and permit operation at previously unobtainable temperatures, such ends are attained with the use of a minimum amount of coolant air so that the gains of increased temperature are not lost by diverting so much air from the compressor that overall engine efficiency is lost.

The described exemplary embodiments will suggest variations, to those skilled in the art, which are within the spirit and scope of the present invention which is therefore to be measured solely by the following claims.

What is claimed is:

1. A structural member integrally formed of high strength material and having a wall, the "outer" surface of which defines, at least in part, a flow path for a hot gas stream moving therepast at a relatively high velocity, said gas stream having a boundary layer contiguous with said "outer" surface in which the gas velocity is substantially reduced, the opposite inner surface of said wall defining, at least in part, a plenum chamber, said wall having a plurality of discrete, relatively small holes therethrough, said holes being essentially circular in cross section and divergently tapered, throughout their lengths toward said "outer" surface.

means for pressurizing gas coolant within said plenum chamber to a pressure somewhat greater than the maximum hot gas static pressure on said "outer" surface and sufficient to discharge coolant gas from said holes, said holes being oriented so that the coolant gas flowing therefrom has a substantial inertia vector component in the plane of said "outer" surface and substantially no inertia vector component in a direction counter to that of the hot gas flow, whereby substantially all of the coolant gas from a given hole is entrained in said boundary layer and spread over a much wider area than the opening of that hole onto said "outer" surface, said holes further being disposed relative to one another so that the coolant streams entrained in said boundary layer cover substantially the entire "outer" surface with coolant air in said boundary layer.

2. A structural member integrally formed of high strength material and having a wall, the "outer" surface of which defines, at least in part, a flow path for a hot gas stream moving therepast at a relatively high velocity, said gas stream having a boundary layer contiguous with said "outer" surface in which the gas velocity is substantially reduced, the opposite, inner surface of said wall defining, at least in part, a plenum chamber, said wall having a plurality of discrete holes therethrough, said holes being essentially circular in cross section and having a diameter between about .005 and .025 inch, means for pressurizing gas coolant within said plenum chamber to a pressure five to eight per cent greater than the maximum hot gas static pressure on said "outer" surface, said holes being angled toward said "outer" surface so that the coolant gas flowing therefrom has a substantial inertia vector component in the plane of said "outer" surface and substantially no inertia vector component in a direction counter to that of the hot gas flow, whereby substantially all of the coolant gas from a given hole is entrained in said boundary layer and spread over a much wider area than the opening of that hole onto said "outer" surface, said holes further being disposed relative to one another so that the coolant streams entrained in said boundary layer cover substantially the entire "outer" surface with coolant air in said boundary layer.

3. A structural member as in claim 2 wherein the angle of the axes of said holes relative to said "outer" surface is between 10 and 30 degrees.

4. A structural member as in claim 2 wherein the holes have flow characteristics of "pipes" and the length of the holes to the diameter of holes is in the ratio of at least 10 to 1.

5. A structural member integrally formed of high strength material and comprising a wall portion which is to be stressed in a direction creating stress lines therein, the "outer" surface of said wall defining, at least in part, a flow path for a hot gas stream moving therepast at a relatively high velocity, said gas stream having a boundary layer contiguous with said "outer" surface in which the gas velocity is substantially reduced, the opposite inner surface of said wall defining, at least in part, a plenum chamber, said wall having a plurality of discrete, relatively small holes therethrough, said holes being circular in cross section and inclined on an angle to said "outer" surface, thereby creating elliptical openings in said "outer" surface, the longer axes of said elliptical openings being generally aligned with the direction of the major stress lines in said structural member, means for pressurizing gas coolant within said plenum chamber to a pressure somewhat greater than the maximum hot gas pressure on said "outer" surface and sufficient to discharge coolant gas from said holes, whereby substantially all of the coolant gas is entrained in said boundary layer and spread over a much wider area than the opening of the hole onto said "outer" surface, said holes further being disposed relative to one another so that the coolant streams entrained in said boundary layer cover substantially said entire "outer"

surface with coolant air in said boundary layer with a minimum of stress concentrations.

6. A structural member as in claim 5 wherein the longer axes are substantially aligned with the stress lines and the holes are arranged in rows and the rows are spaced apart to provide maximum strength for the structural member consistent with the cooling requirements therefor.

7. A structural member as in claim 6 wherein the holes in a given row are spaced apart a minimum distance of two diameters between axes, measured in a direction normal thereto.

8. A blade for use in gas turbines operating at extreme high temperatures, said blade comprising an integral thin-walled, high strength metal shell of airfoil cross section, the outer surface of said shell defining, at least in part, a flow path for a hot gas stream moving therepast at a high velocity, said gas stream having a boundary layer contiguous with said outer surface in which the gas velocity is substantially reduced, the interior of said shell defining, at least in part, a plenum chamber, said shell having a plurality of discrete, relatively small holes therethrough, said holes being essentially circular in cross section and divergently tapered, throughout their lengths, toward said outer surface, said holes being closely spaced around the leading edge of said airfoil section, and spaced further apart on opposite sides thereof in a chordal direction, said holes being inclined on an angle relative to said outer surface and extending in a direction having no component counter to that of the hot gas flow, means for pressurizing gas coolant within the plenum chamber defined by the interior of said shell to a pressure somewhat greater than the maximum hot gas static pressure on said outer surface and sufficient to discharge coolant gas from said holes, whereby substantially all of the coolant gas from a given hole is entrained in said boundary layer and spread over a much wider area than the opening of that hole onto said outer surface, said holes further being disposed relative to one another so that the coolant streams entrained in said boundary layer cover substantially the entire outer surface of said airfoil shaped shell with coolant air in said boundary layer.

9. A blade for use in gas turbines operating at extreme high temperatures, said blade comprising an integral thin-walled, high strength metal shell of airfoil cross section which is stressed in a direction creating stress lines lengthwise of said blade, the outer surface of said shell defining, at least in part, a flow path for a hot gas stream moving therepast at a high velocity, said gas stream having a boundary layer contiguous with said outer surface in which the gas velocity is substantially reduced, the interior of said shell defining, at least in part, a plenum chamber, said shell having a plurality of discrete, relatively small holes therethrough, said holes being essentially circular in cross section and having a diameter between about .005 and .025 inch, said holes further being inclined on an angle to said outer surface in a direction lengthwise of the blade, thereby creating elliptical openings in said outer surface, the longer axes of which are aligned with the stress lines in said blade, said holes being closely spaced around the leading edge portion of said airfoil section and spaced further apart on opposite sides thereof in a chordal direction, means for pressurizing gas coolant within the plenum chamber defined by the interior of said shell to a pressure five to eight percent greater than the maximum hot gas static pressure on said outer surface to discharge coolant gas from said holes whereby substantially all of the coolant gas from a given hole is entrained in said boundary layer and spread over a much wider area than the opening of that hole onto said outer surface, said holes further being disposed relative to one another so that the coolant streams entrained in said boundary layer cover substantially the entire outer surface with coolant air in said boundary layer.

10. A blade as in claim 9 wherein the holes through said shell are aligned in rows extending lengthwise of the blade and said rows are closely spaced around the leading edge portion of the airfoil cross section and spaced further apart chordally thereof, and further wherein the holes in the rows around leading edge portion are spaced apart a distance of two diameters between adjacent axes measured in a direction normal thereto.

11. A blade as in claim 9 wherein the angle between the axes of the holes and the outer surface is between 10 and 30 degrees and further wherein the holes have flow characteristics of "pipes" and the length of the holes to the diameter of the holes is in the ratio of at least ten to one.

12. A turbine rotor bucket for use in gas turbines operating at extreme high temperatures, said rotor bucket comprising an integral thin-walled, high strength metal shell of airfoil cross section with a leading and trailing edge and closed at its outer end, the outer surface of said shell defining, at least in part, a flow path for a hot gas stream moving therepast at a high velocity, said gas stream having a boundary layer contiguous with said outer surface in which the gas velocity is substantially reduced, the interior of said shell defining, at least in part, a plenum chamber, the inner end of said bucket having passageways therethrough, said passageways being connected to a source of pressurized gas coolant pressurizing the plenum chamber to a pressure somewhat greater than the static pressure of the hot gas on the outer surface of said shell, said shell having a plurality of discrete, relatively small holes therethrough, said holes being closely spaced around the leading edge portion of said airfoil section and spaced further apart on opposite sides thereof in a chordal direction, said holes being inclined on an angle relative to said outer surface and extending in a direction toward the outer end of said bucket, thereby creating elliptical openings in the surfaces of said shell, the longer axes of which are aligned with the stress lines in said bucket, whereby the pressurized gas coolant within the plenum chamber defined by the interior of said shell is discharged through said holes and the coolant gas from a given hole is entrained in said boundary layer and spread over a much wider area than the opening of that hole onto said outer surface, said holes further being disposed relative to one another so that the coolant streams entrained in said boundary layer cover substantially the entire outer surface of said airfoil shaped shell with coolant air in said boundary layer.

13. A turbine bucket as in claim 12 wherein a platform is integrally formed at the base of said airfoil section and a plurality of discrete, relatively small holes are provided therethrough for the passage of coolant air therethrough, and further wherein the closed outer end of said shell is provided with a plurality of relatively small discrete holes therethrough, so that coolant gas from the plenum chamber will cool that portion of the bucket as well.

14. A turbine stator blade for use in gas turbines operating at extreme high temperatures, said stator blade extending lengthwise across a hot gas flow path and comprising an integral thin-walled high strength metal shell of airfoil cross section, the outer surface of said shell defining, at least in part, a flow path for a hot gas stream moving therepast at a high velocity, said gas stream having a boundary layer contiguous with said outer surface in which the gas velocity is substantially reduced, the interior of said shell defining, at least in part, a plenum chamber, the opposite ends of said blade having passageways therethrough, said passageways being connected to a source of pressurized gas coolant pressurizing the plenum chamber to a pressure somewhat greater than the static pressure of the hot gas on the outer surface of said shell, said shell having a plurality of discrete, relatively small holes therethrough, said holes being closely spaced around the leading edge portion of said airfoil section and spaced further apart on opposite sides thereof in a chordal direction, said holes being inclined lengthwise of said blade on an angle relative to said outer surface, thereby creating elliptical openings in the surfaces of said shell, the longer axes of which are substantially aligned with the stress lines in said bucket, the holes adjacent one end of said shell being inclined towards the other end and the holes adjacent the other end being inclined towards said one end, whereby the pressurized gas coolant within the plenum chamber defined by the interior of said shell is discharged through said holes and the coolant gas from a given hole is entrained in said boundary layer and spread over a much wider area than the opening of that hole onto said outer surface, said holes further being disposed relative to one another so that the coolant streams entrained in said boundary layer cover substantially the entire outer surface of said airfoil shaped shell with coolant air in said boundary layer.

References Cited

UNITED STATES PATENTS

| 2,149,510 | 3/1939 | Darrieus | 253—39.15 |
| 2,489,683 | 11/1949 | Stalker | 230—122 |
| 2,585,871 | 2/1952 | Stalker | 253—39.15 |
| 2,785,878 | 3/1957 | Conrad | 60—39.66 |

FOREIGN PATENTS 619,634   3/1949   Great Britain.

SAMUEL FEINBERG, Primary Examiner

U.S. Cl. X.R.

415—115; 416—231